United States Patent [19]

Dalferth

[11] Patent Number: 5,730,280
[45] Date of Patent: Mar. 24, 1998

[54] PLATE LINK CHAIN

[76] Inventor: Hans Horst Dalferth, Eifelstrasse 21, D-73433 Aalen, Germany

[21] Appl. No.: 713,552

[22] Filed: Sep. 24, 1996

[30] Foreign Application Priority Data

Oct. 4, 1995 [AT] Austria .................................. 1647/95

[51] Int. Cl.⁶ .................................................. B65G 17/36
[52] U.S. Cl. ................................................... 198/712
[58] Field of Search .............................. 198/701, 707, 198/711, 712

[56] References Cited

U.S. PATENT DOCUMENTS

| | | | |
|---|---|---|---|
| 808,637 | 1/1906 | Crossley | 198/712 |
| 1,003,038 | 9/1911 | Dekker | 198/712 |
| 1,111,823 | 9/1914 | Coldren | 198/712 |
| 1,422,151 | 7/1922 | Walker | 198/712 |
| 1,690,838 | 11/1928 | Rosabeck | 198/712 X |
| 3,040,873 | 6/1962 | Hobbs, Jr. | 198/712 |
| 3,044,604 | 7/1962 | Steigleder | 198/701 X |
| 3,659,698 | 5/1972 | Rieger | 198/712 |
| 4,736,832 | 4/1988 | Rinio | 198/712 |

FOREIGN PATENT DOCUMENTS

| | | | |
|---|---|---|---|
| 3503302 | 8/1986 | Germany . | |
| 3545634 | 6/1987 | Germany | 198/712 |
| 4233552 | 3/1994 | Germany . | |

*Primary Examiner*—James R. Bidwell
*Attorney, Agent, or Firm*—Mark P. Stone

[57] ABSTRACT

In a plate link chain for bucket conveyors, the inner links (12) together with in each case two chain pins (9) form a prefabricated frame-like unit to which the outer links (7), provided with bushings (5) for fastening the plate link chain on connection webs (3) on the buckets, can be connected by a combined fit-in and pivoting movement.

11 Claims, 1 Drawing Sheet

PLATE LINK CHAIN

BACKGROUND OF THE INVENTION

The invention relates to a plate link chain for bucket conveyor with buckets which have connection webs, an which chain the outer and inner links are connected to one another by chain pins whose ends are mounted rotatably in bushings which are connected in a rotationally fixed manner to the outer links and serve to connect the chain to the connection webs.

A plate link chain of the abovementioned type is known from DE-A-42 33 552. In the known plate link chain, the inner links are likewise connected in a rotationally fixed manner to a bushing which is mounted rotatably on their chain pins, with the result that the chain pin is mounted in a floating manner in two lateral bushings and one central bushing. The outlined arrangement makes assembly of the plate link chain, which is to be carried out on site, noticeably easier than in the case of another plate link chain which is known from DE-A-35 03 302 and whose outer links are provided with transverse bores which enclose the chain pins with a press fit. While, in the last-mentioned case, it is essential to make use of press-in devices on site, all that is necessary in the first-mentioned case is for the individual parts of the plate link chain to be fitted together. In the two known designs, the chain pins constitute carriers on two supports, the latter being formed by the connection webs and the outer links. The elastic deformation of the chain pins which occurs under loading may result in the formation of scoring on the circumference of the chain pins in the region of the end sides of the bushings which bear the inner links, and this is in spite of the supporting action for the chain pins which is provided by the bushing. It goes without saying that such scoring is not only undesirable, but its occurrence is ultimately-the result of an increased energy expenditure for driving the bucket conveyor.

SUMMARY OF THE INVENTION

The object of the invention is to configure a plate link chain of the generic type under consideration such that, while maintaining the capacity for easy assembly on site, undesired scoring on the chain pins is avoided. This object is achieved according to the invention in a surprisingly simple manner in that the inner links are connected in a rotationally fixed manner to the chain pins.

The plate link chain according to the invention combines the advantages of great simplicity and capacity for easy assembly. It comprises units which are each formed by two inner links and two chain pins, as well as outer links which can be fitted onto the ends of the chain pins and are provided with bushings. Since there are no longer any frictional losses between the inner links and the chain pins, the energy required for driving the bucket conveyor is reduced. Individual outer links or units can be exchanged without difficulty.

It has proved particularly advantageous if the external diameter of the section of the chain pin which is connected to the inner links is equal to the external diameter of the bushings connected to the outer links. In such a case, it is possible for the outer links and inner links to be of identical design.

Further details and features of the invention can be gathered from the subclaims and from the following description of a preferred embodiment of the invention.

DESCRIPTION OF THE BEST MODES FOR CARRYING OUT THE INVENTION

Figure 1:
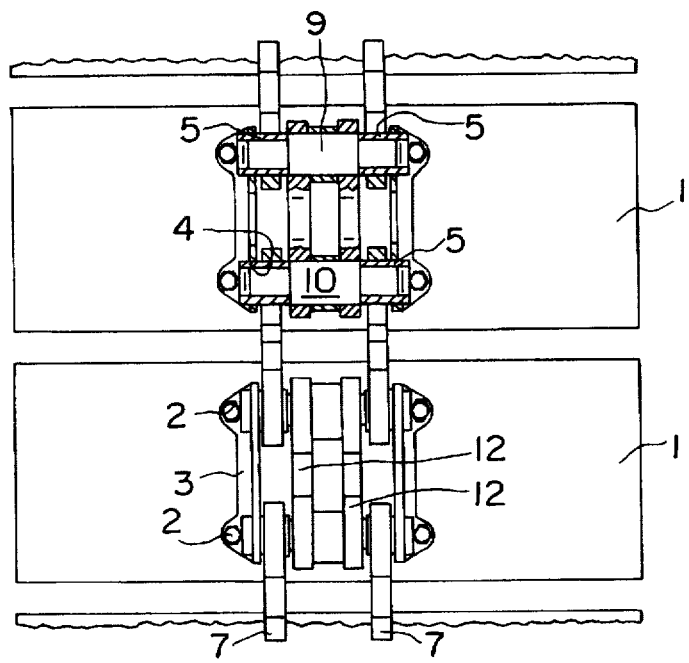
FIG. 1 shows, partially in section, a plate-link-chain section which is connected to the rear of buckets.
Figure 2:
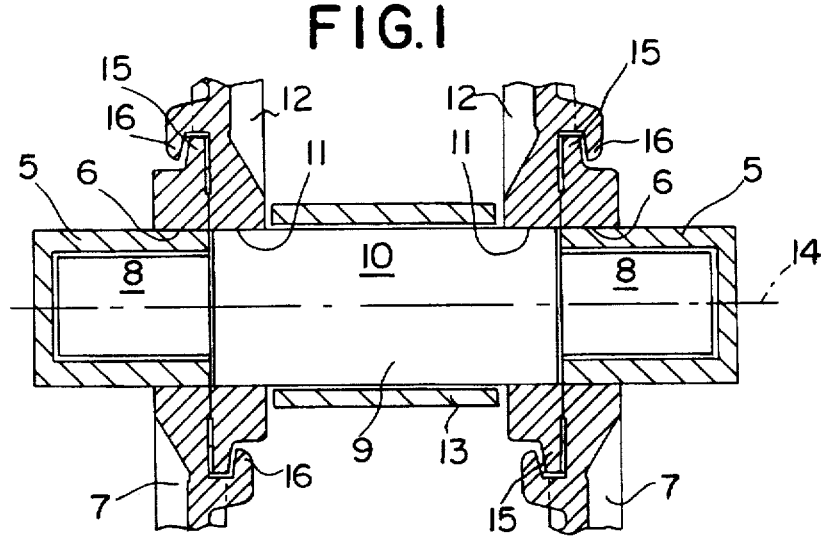
FIG. 2 shows, on an enlarged scale, a detail of the plate link chain illustrated in FIG. 1.

In FIG. 1, two successive buckets of a plate-link-chain bucket conveyor are designated by 1. The buckets 1 are connected, by means of angular connection webs 3 fastened on their rear wall by screws 2, to the plate link chain which drives them. Each of the connection webs 3 has two bores 4 which are spaced apart from one another by a distance corresponding to the chain spacing and in which there are mounted, with play, bushings 5 which are designed in the form of caps, which are pressed into the eyelets 6 of the outer links 7 of the plate link chain, and into which the stepped ends 8 of the chain pins 9 project. As most clearly seen in FIG. 2 of the drawing, the width of each of the bushinings 5 is greater than the width of each of the outer links 7 of the plate link chain. The inner links 12 provided with bores 11 are pressed, at a distance from one another, onto the section 10 of the chain pins 9 which is respectively located between the ends 8, a prefabricated frame-like, stable unit being formed in each case by two inner links 12, two chain pins 9 and two sleeves 13, which advantageously influence the running of the chain over chain wheels.

Figure 3:
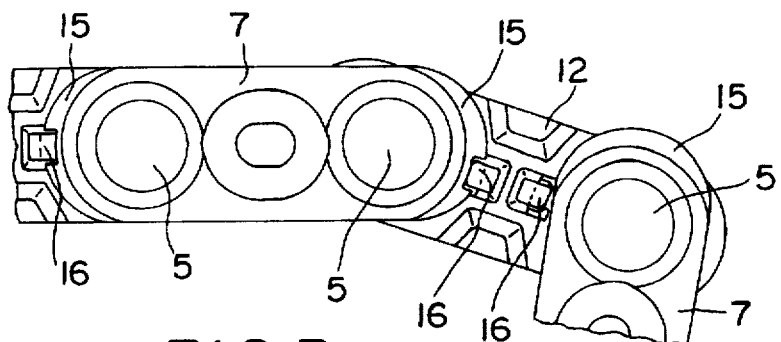
FIG. 3 shows a side view of part of the plate link chain according to FIGS. 1 and 2.

In order to prevent relative movements of the outer links 7 with respect to the inner links 12 in the direction of the longitudinal axis 14 of the chain pins 9, the ends of the outer and inner links are connected to one another in the manner of a bayonet closure. For this purpose, they have two coupling elements 15 and 16, of which one is designed as a sickle-shaped cam and one is designed as a hook-shaped protrusion which engages over said cam in the possible operating positions of successive links 7, 12. Due to the selected form of the coupling elements 15, 16, the outer links 7, as is shown in the right-hand part of FIG. 3, can be pushed onto the chain pins 9 by means of their bushings 5 and then pivoted into a locking position.

I claim:

1. A plate link chain for a bucket conveyor with buckets which have connection webs, in which chain the outer and inner links are connected to one another by chain pins whose ends are mounted rotatably in bushings which are connected in a rotationally fixed manner to the outer links and serve to connect the chain to the connection webs, wherein the inner links (12) are connected in a rotationally fixed manner to the chain pins (9).

2. The plate link chain as claimed in claim 1, wherein the chain pins (9) are pressed into bores (11) of the inner links (12).

3. The plate link chain as claimed in claim 1, wherein a sleeve (13) is mounted rotatably on that part of the chain pin (9) which is located between the inner links (12).

4. The plate link chain as claimed in claim 1, wherein the external diameter of the section (10) of the chain pin (9) which is connected to the inner links (12) is equal to the external diameter of the bushings (5) connected to the outer links (7).

5. The plate link chain as claimed in claim 4, wherein the outer and inner links (7, 12) are of identical design.

6. The plate link chain as claimed in claim 1, wherein the respectively successive outer and inner links (7, 12) are secured against relative movements in the direction of the longitudinal axis (14) of the chain pins (9) by coupling elements (15, 16) which can be brought into engagement in the manner of a bayonet closure.

7. The plate link chain as claimed in claim 1, wherein the bushings (5) pressed into the outer links (7) are designed in the form of caps.

8. The plate link chain as claimed in claim 2, wherein a sleeve (13) is mounted rotatably on that part of the chain pin (9) which is located between the inner links (12).

9. The plate link as claimed in claim 2, wherein the external diameter of the section (10) of the chain pin (9) which is connected to the inner links (12) is equal to the external diameter of the bushings (5) connected to the outer links (7).

10. The plate link chain as claimed in claim 3, wherein the external diameter of the section (10) of the chain pin (9) which is connected to the inner links (12) is equal to the external diameter of the bushings (5) connected to the outer links (7).

11. A plate link chain for a bucket conveyor with buckets which have connection webs, in which chain the outer and inner links are connected to one another by chain pins whose ends are mounted rotatably in bushings which are connected in a rotationally fixed manner to the outer links and serve to connect the chain to the connection webs, the width of each of the bushings being greater than the width of each of the outer links of the plate link chain, wherein the inner links (12) are connected in a rotationally fixed manner to the chain pins (9).

* * * * *